United States Patent
Bottreau et al.

(10) Patent No.: US 6,985,526 B2
(45) Date of Patent: Jan. 10, 2006

(54) SNR SCALABLE VIDEO ENCODING METHOD AND CORRESPONDING DECODING METHOD

(75) Inventors: Vincent Bottreau, Paris (FR); Marion Benetiere, Nogent sur Marne (FR); Beatrice Pesquet-Popescu, Fontenay-Sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 536 days.

(21) Appl. No.: 09/914,240

(22) PCT Filed: Dec. 22, 2000

(86) PCT No.: PCT/EP00/13206

§ 371 (c)(1),
(2), (4) Date: Aug. 24, 2001

(87) PCT Pub. No.: WO01/49036

PCT Pub. Date: Jul. 5, 2001

(65) Prior Publication Data

US 2002/0159518 A1    Oct. 31, 2002

(30) Foreign Application Priority Data

Dec. 28, 1999    (EP)    ................. 99403308

(51) Int. Cl.
*H04B 1/66*    (2006.01)

(52) U.S. Cl. ............. 375/240.1; 375/240.09; 375/240.16; 375/240.12; 375/240.26; 348/699; 382/240; 382/235; 382/241; 382/236

(58) Field of Classification Search ............ 375/240.1, 375/240.12, 240.16, 240.09, 240.26; 348/414, 348/417, 418, 422, 699; 382/240, 235, 241, 382/236
See application file for complete search history.

(56) References Cited

U.S. PATENT DOCUMENTS

| | | | | |
|---|---|---|---|---|
| 5,699,121 A | * | 12/1997 | Zakhor et al. | ......... 375/240.17 |
| 6,148,026 A | * | 11/2000 | Puri et al. | .................... 375/240 |
| 6,292,512 B1 | * | 9/2001 | Radha et al. | ............ 375/240.1 |
| 6,577,310 B1 | * | 6/2003 | Kim et al. | .................. 345/427 |

* cited by examiner

*Primary Examiner*—Shawn S. An

(57) ABSTRACT

The invention relates to scalable video encoders, and, more precisely, to an encoder comprising a base layer and at least an enhancement layer circuit, said circuits being capable of generating enhancement layer video data associated with compressed base layer video data and suitable for transmission to a video decoder. In said encoder, the implemented encoding method, based on a hierarchical triangular mesh representation to which a matching pursuit error coding step is specifically adapted, comprises a base layer encoding step and enhancement layer encoding steps.

The invention also relates to a corresponding decoding method.

2 Claims, 3 Drawing Sheets

Mesh level 1

Mesh level 2

Mesh level 3

SNR SCALABLE VIDEO ENCODING METHOD AND CORRESPONDING DECODING METHOD

FIELD OF THE INVENTION

The present invention relates to an encoding method for use in an SNR (signal-to-noise ratio) scalable video encoder, and to a corresponding decoding method.

BACKGROUND OF THE INVENTION

In video compression, scalability is the expected functionality to address the ever growing constraints of video transmission over heterogeneous networks (bandwidth, error rate . . . ) in terms of varying receiver capabilities and demands (CPU, display size, application). It indeed allows a progressive transmission of information (in layers, or not) in order to provide a quality level of the reconstructed video sequence that is proportional to the amount of information that is taken of the bitstream.

Although they have not been initially designed to address these issues, current standards tried to upgrade their video coding schemes in order to include this functionality. In quality or SNR scalable compression schemes, temporal and spatial resolutions are kept the same, but the image quality is intended to vary depending on how much of the bitstream is decoded. In practice, most standards provide SNR scalability by means of a layered structure without giving tip the classical single-scale scheme. The base layer (BL) is generally highly and efficiently compressed by a hybrid predictive encoding loop. The enhancement layer (EL) improves the quality of the compressed video signal by encoding the residual error (or prediction error), which is the difference between the original image and a reconstructed image. In MPEG-4 version 4, for instance, the EL uses DCT bit-planes to reencode this residual error.

The resulting scalability is however suboptimal for two main reasons. First, it is only based on an additional encoding of the prediction error and does not involve any refinement of the motion estimation and compensation processes. Moreover, it employs coding techniques like DCT that are not intrinsically designed to provide a progressive information transmission. For a more efficient scalable video coding, hierarchical strategies then appear to be promising candidates. The main idea is to design schemes that provide a generalized hierarchical representation of the information, opening the way to scalability. Schematically a simple hierarchical video coding scheme may be composed of several levels, each of which delivers a better-reconstructed image by means of a global refinement process (for instance, the hierarchy may use a pyramid composed of several image resolutions).

In parallel, hierarchical hybrid predictive coding schemes using non-block image representations like triangular meshes also constitute an interesting alternative. Meshes are well adapted to prediction error coding since they efficiently make the distinction between smooth regions and contours, well-compensated areas and occlusion regions. However, existing mesh-based methods generally encode the prediction error in a traditional way (block-based DCT, for example), i.e. by treating the error image as a whole picture without using the mesh employed during the motion estimation and compensation stages. These methods suffer from a lack of flexibility, especially at low bit-rates, and do not provide an embedded bitstream.

An alternative to DCT, better suited to low bit rate and tested in MEPG-4, is based on the so-called Matching Pursuit (MP) algorithm, described for instance in "Matching pursuits with time-frequency dictionaries", by S. Mallat and Z. Zhang, IEEE Transactions on Signal Processing, vol.41, n°12, December 1993, pp.3397–3415. Indeed, MP is particularly well suited to the progressive texture encoding of arbitrarily shaped objects. Moreover, an intrinsic way of providing SNR scalability with MP is through the number of encoded "atoms". MP naturally achieves scalability by encoding the motion prediction error in decreasing order of energy. The procedure is iteratively applied until either the bit budget is exhausted or the distortion falls down below a prespecified threshold. The granularity of MP is the coding cost of one atom, that is approximately 20 bits.

In the European patent application filed on Dec. $28^{th}$, 1999, under the filing number 99403307.4 (PHF99627), an MP prediction error coding method has been included inside a hierarchical mesh-based video coding scheme, which allows to benefit from the triangular mesh advantages concerning spatial adaptability, deformation capacity, compact and robust motion estimation even at low bit rates The mesh hierarchy of this scheme is obtained through a coarse-to-fine strategy, beginning at the first level with a coarse regular triangular mesh, and which then includes a mesh refinement process locally subdividing triangles of the current level where the prediction error signal is still important after motion compensation (the new mesh is taken as the input for the following level). Based on the MP algorithm, this method benefits from the mesh characteristics, while being especially designed to match the triangle support. Given any selected triangle, the issue is first to find the optimal strategy for atom positioning inside said triangle, resulting in a fast energy decrease of the error signal and a precise and smooth signal decomposition.

A first positioning method, of a geometrical type, results in a bit budget gain in comparison to the block-based approach for which each atom position has to be encoded. If this geometrical choice ensures that the atoms stay in the middle of the triangle, it results however in loosing the property of the MP with respect to the positioning freedom. By reusing the error energy information for atom center positioning, an atom coding efficiency more similar to the block-based approach is then obtained. This second implementation may still be improved by adding to it the possibility to orient one atom axis along the direction of the most important energy. A better atom positioning is thus obtained, the atom axes being aligned with the error signal that has to be approximated.

With respect to the method thus described, the triangular mesh-based video-coding scheme may be improved by a hierarchical representation. Hierarchy addresses the issue of finding optimal patch sizes and a tool for providing a description that is progressively refined from level to level (thus, allowing scalability). The hierarchy may be initialized to an arbitrary coarse mesh that is successively refined according to a specified criterion (energy for instance). The hierarchy used in the present case consists in combining a mesh grid with the image at each resolution, to the effect that the coarsest mesh is coupled to the lowest resolution image (here, the term resolution refers to a low-pass filtering that is performed on source images without any downsampling, and not to a decimation). Thus, image and mesh couples consist of elements that provide an information accuracy increasing with the level.

For instance, small triangles provide a precise motion modeling but are not well suited for large movements. On the contrary, the coarsest mesh allows global motion estimation. Then, propagating an updating this movement on refined meshes made of smallest triangles produces local optimization. Furthermore, no regularization or smoothing constraints are needed because of this mesh size control. FIG. 1 shows an example of mesh hierarchy, the image quality obviously evolving as said mesh hierarchy.

However, considering only the hierarchical feature of these tools, it appears that they do not provide scalability on their own. The reason is that motion estimation is performed at each hierarchy level between the same source images as for the first level.

SUMMARY OF THE INVENTION

An object of the invention is therefore to propose, for an implementation in a SNR scalable video coding scheme, an encoding method really addressing the issue of SNR scalability, by means of an improvement of the coding efficiency of the enhancement layer(s).

To this end, the invention—in view of its use in an SNR scalable video encoder comprising, for allowing a progressive transmission of information, a base layer circuit capable of receiving an input stream of video images and generating therefrom compressed base layer video data suitable for transmission to a video decoder and at least an enhancement layer circuit capable of generating therefrom enhancement layer video data associated with the compressed base layer video data and suitable for transmission to the video decoder—relates to an encoding method based on a hierarchical triangular mesh representation to which a matching pursuit error coding step is specifically adapted, said encoding method comprising the following steps:

a base layer encoding step, provided for receiving a couple of reference and current images N-1 and N and a coarse mesh and encoding by means of a matching pursuit method the error residual image $\epsilon_1$ between the current image N and an associated motion compensated image $Nc_1$;

a first enhancement layer encoding step, provided for receiving said current image and a reconstructed image $N'c_1$ obtained by adding to the motion compensated image $Nc_1$ the motion residual image reconstructed from the coded error residual image $\epsilon_1$, and for generating from the difference between said current image and said reconstructed image $Nc'_1$ a new error residual image $\epsilon'_1$ used to refine the current level mesh "Mesh 1" towards a new mesh "Mesh 2" then taken as input for a further level, the information concerning the mesh distortion being contained in motion vectors $MV_1$;

at least another enhancement layer encoding step including similar receiving and generating operations; the matching pursuit method being applied during each encoding step to the error residual image $\epsilon_i$ in view of the transmission of the texture information in the form of atoms.

Based on a hierarchical triangular mesh representation, the invention provides an intrinsically SNR scalable coding scheme, which at each level jointly refines the grid (by further splitting mesh triangles), the motion estimation and compensation processes and the texture of the motion compensated image (by coding the prediction error with a MP method adapted to the mesh structure of this level). Therefore, the reconstructed image quality progressively increases from level to level. Moreover, thanks to MP characteristics, the part of the bitstream dedicated to the prediction error texture coding is embedded.

Another object of the invention is to propose a corresponding decoding method.

To this end, the invention, provided for an use in an SNR scalable video decoder receiving signals coded by a video encoder comprising a base layer circuit capable of receiving an input stream of video images and generating therefrom compressed base layer video data suitable for transmission to a video decoder and at least an enhancement layer circuit capable of generating therefrom enhancement layer video data associated with the compressed base layer video data and suitable for transmission to the video decoder, relates to a decoding method comprising the following steps:

a decoding step of the coded, first original image;

a decoding step of the following coded images, said coded images being reconstructed from the information related to meshes, transmitted atoms and motion vectors contained in the layers corresponding to each encoding step, said reconstruction operation itself including the successive sub-steps of reconstructing the base layer image, refining said base layer image by applying corresponding motion vectors, and adding texture information contained in the transmitted atoms.

BRIEF DESCRIPTION OF THE DRAWINGS

The particularities of the invention will now be explained in a more detailed manner, with reference to the accompanying drawings in which.

DETAILED DESCRIPTION OF THE INVENTION

Figure 1:
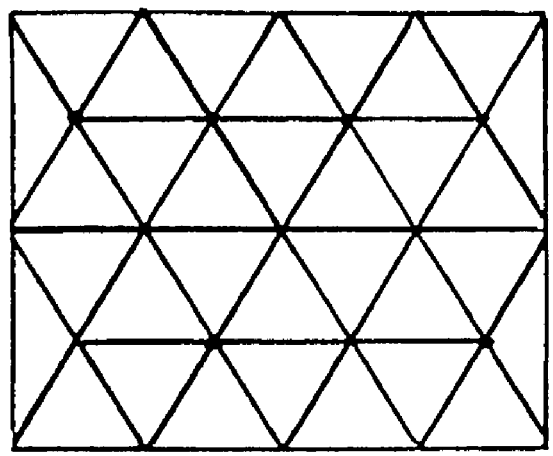
FIG. 1 illustrates three levels of a mesh hierarchy.
Figure 1:
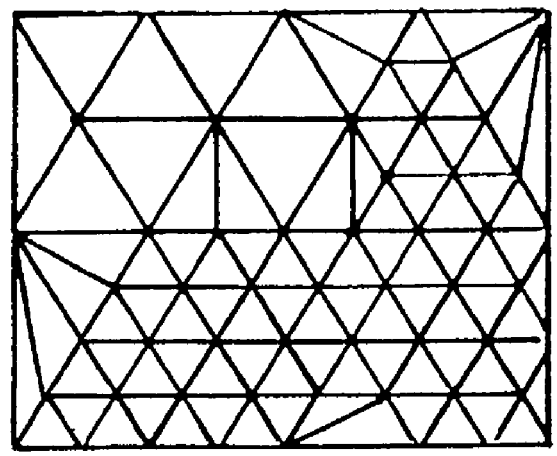
Figure 1:
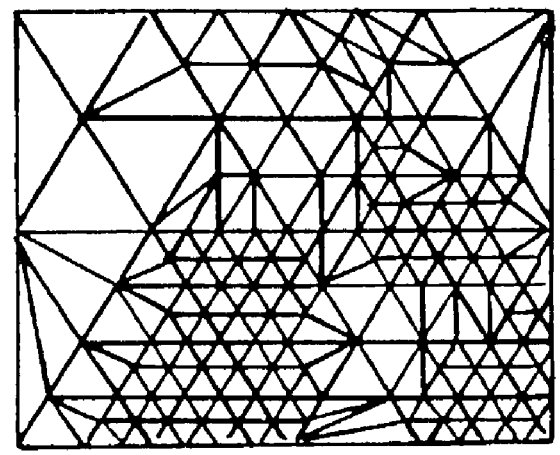

The present invention improves said previous work by efficiently combining the MP algorithm with the hierarchical feature of the mesh-based structure so as to provide SNR scalability. The targeted BL and EL have been naturally associated to the different levels of the mesh hierarchy. The BL consists of the combination of the coarsest mesh, the associated motion vectors, the MP-coded atoms and the first level reconstructed image. The BL image is the first level motion compensated image whose quality has been improved by adding atoms coming from the MP encoding of the corresponding motion residual image.

A strong requirement for scalability is that the encoder only uses the information that will be available at the decoder side so as to avoid any drift problem. This constraint constitutes the real cost of scalability. Indeed, the general issue concerning scalability is the efficient combination of two information sources: the reconstructed images obtained at previous layers inside the hierarchy for image N and the already encoded layers of images N-1. While the original hierarchy did not provide scalability because the enhancement levels were taking as inputs the same images as for the first level, the present invention proposes to take:

the BL of the previous image as the reference image for the current image BL motion estimation, the current level reconstructed image as an input for the next hierarchy level.

More precisely, the coarsest mesh is refined at the first level for the next ones according to the DFD energy between the BL reconstructed image and the current image N. Once refined, i.e. updated by splitting triangles with the highest residual energy, this mesh is used at the second level to improve the previous motion vectors. The coarsest mesh motion vectors are propagated from parent to child nodal points and are used as initial values for a new motion estimation process between the same reference and current images. The motion estimation and motion compensation processes are thus also refined. Nevertheless, this new reconstructed image can not be easily derived from the previous level reconstructed image. The reason is that they have not been obtained with the same parameters, although both images represent an approximation of the same image, that is the current image N. It is actually undesirable to send to the decoder too many information overheads and a fortiori to send a second time the same information, here the motion information. In the same manner, the corresponding motion residual image (at the second level) is MP-coded to obtain the reconstructed image of the current level, the same way as for the first one. Atoms are encoded in order to improve the texture of the motion compensated image. However, atoms contained in the first level reconstructed image are in this case not used. Therefore, encoded and transmitted atoms at previous level are no longer of any use for computing the EL at the decoder side, which is not satisfactory as far as scalability is concerned.

For these reasons, so as to improve the coding efficiency of the enhancement layers, the previous level reconstructed image will now be used as input for the next level of the hierarchical coding scheme. The main advantages of the invention are consequently.

- each encoded information (motion, texture, mesh, atoms . . . ) at a given level is intrinsically used at the following ones since enhancement levels take as inputs the previous layer components;
- a given level really represents the enhancement of the previous one by progressively addition refinement data (motion vectors for motion refinement and atoms for texture enhancement);
- scalability is preserved since all processed images are available at the decoder side, which prevents from having any coding drift.

Figure 2:
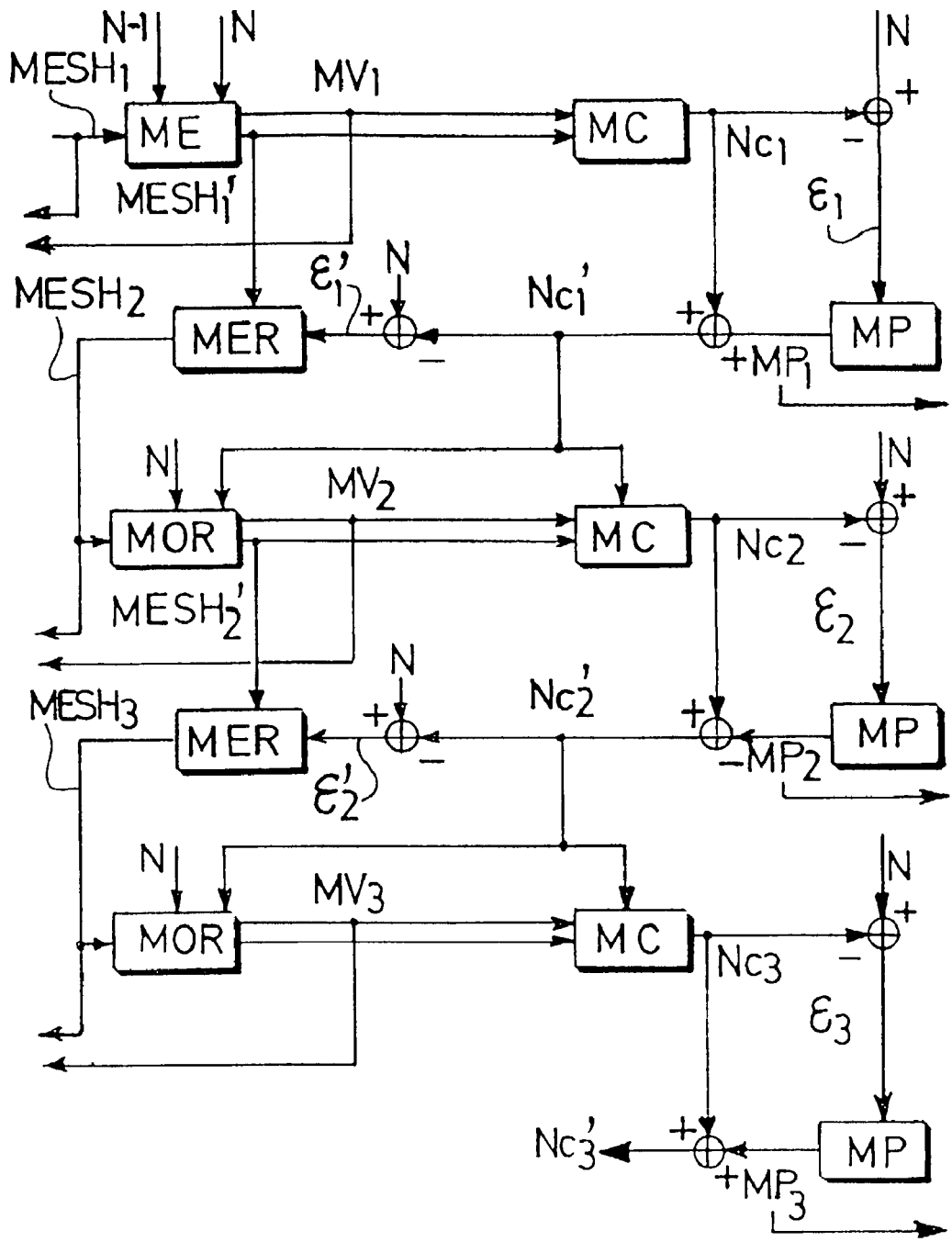
FIGS. 2 and 3 respectively illustrate the encoding and decoding methods according to the invention and, in the same time, show a block diagram of the corresponding encoder and decoder.
Figure 3:
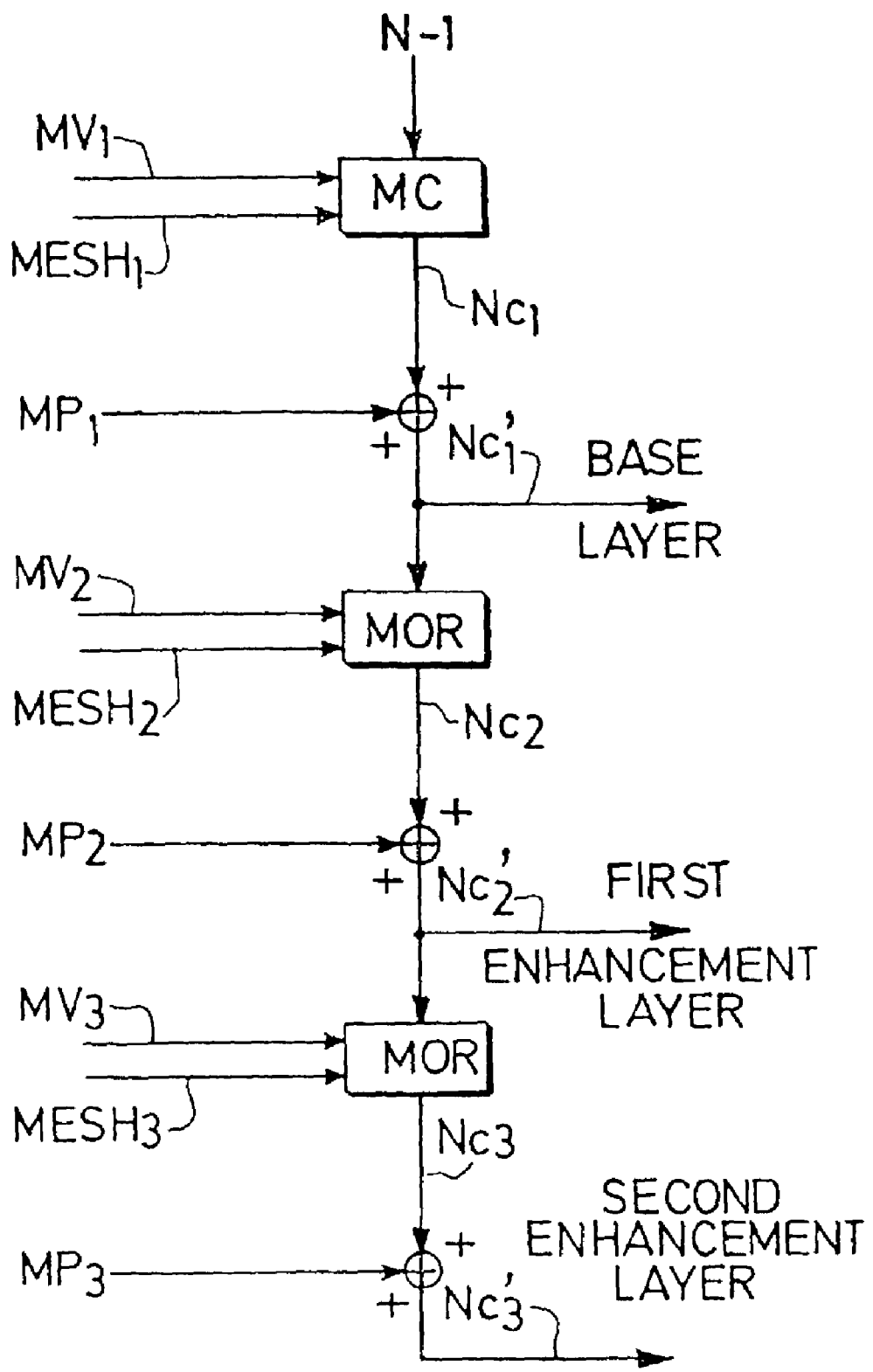

The proposed SNR scalable coding scheme consists of three levels as described hereinafter. FIGS. 2 and 3 respectively illustrate a block diagram of the encoder and a block diagram of the decoder according to the invention. The level 1 corresponds to the base layer, whereas the levels 2 and 3 correspond to two enhancement layers. Potentially, this scheme may be completed with more enhancement layers.

The notations used in FIGS. 2 and 3 are the following: ME=Motion estimation; MC=motion compensation; MER: mesh refinement; MOR=motion refinement; MP= matching pursuit. The encoder takes as input a couple of images (reference and current images N-1 and N) and a mesh (the coarsest one), and $\epsilon_i$ stands for the error residual image between the current image N and the motion compensated image $Nc_i$ after the i-th level (i= 1, 2, 3 in this example). This error residual image $\epsilon_i$, is encoded by Matching Pursuit and reconstructed by means of the encoded atoms $MP_i$. This reconstructed motion residual image is added to $Nc_i$ to produce the enhanced (or reconstructed) image $Nc'_i$, which corresponds to the current level layer image. The new error residual image $\epsilon_i'$ between N and $Nc_i'$ is used to refine the current level mesh $Mesh_i$ towards mesh $Mesh'_i$, which is taken as input for the next level, i+1. The information concerning the mesh distortion is contained in motion vectors ($MV_i$), which represent the vertex displacements. Since meshes share common nodes, it is useless to completely transmit them. It is sufficient to transmit the new nodes at each level.

Error residual images $\epsilon_i'$ correspond to the differences between the current image N and the motion compensated images $Nc_i$. The operations that produces the second and third motion compensated image is nonetheless not a motion estimation strictly speaking since it is applied between two versions of image N: image N itself and the previous reconstructed image $Nc_i'$, i.e. the motion compensated image that has been enhanced by the MP-coded atoms. As a matter of fact, this introduces a break in the motion field. If the theoretical assumptions of this method may be questionable, it is efficient in both terms of PSNR and visual results. This method allows to exploit at the same time motion and texture data that have been brought by the previous level. Therefore, the invention provides a response to the issue of SNR scalability inside hierarchical coding schemes.

Assuming that the first original image has been encoded in intra mode and transmitted, following inter-coded images can be reconstructed at the decoder side thanks to the information related to meshes, atoms and motion vectors contained in the three layers. FIG. 3 shows the way in which the three enhanced images are reconstructed at the decoder side. Once decoded, the base layer image $N_{c1'}$ may be refined by applying motion vectors $MV_2$ and adding texture information contained in transmitted atoms $MP_2$ and adding texture information contained in transmitted atoms $MP_2$. Moreover, the texture enhancement provided by atoms is progressive thanks to the characteristics of the Matching Pursuit method. According to the decoder complexity, the refinement process may be carried on to the following enhancement layer.

The invention addresses the issue of SNR scalability inside a hierarchical mesh-based video-coding scheme, which offers a powerful and flexible framework for scalable applications. A Matching Pursuit prediction error coding method, specifically adapted to the triangular mesh support, is used inside a hierarchical coding scheme, which has been modified so as to provide a progressive information compression.

What is claimed is:

1. For use in an SNR scalable video encoder comprising, for allowing a progressive transmission of information, a base layer circuit capable of receiving an input stream of video images and generating therefrom compressed base layer video data suitable for transmission to a video decoder and at least an enhancement layer circuit capable of generating therefrom enhancement layer video data associated with the compressed base layer video data and suitable for transmission to the video decoder, an encoding method based on a hierarchical triangular mesh representation to which a matching pursuit error coding step is specifically adapted, said encoding method comprising the following steps:

a base layer encoding step, provided for receiving a couple of reference and current images N-1 and N and a coarse mesh and encoding by means of a matching pursuit method the error residual image $\epsilon_1$ between the current image N and an associated motion compensated image $Nc_1$;

a first enhancement layer encoding step, provided for receiving said current image and a reconstructed image $N'c_1$ obtained by adding to the motion compensated image $Nc_1$ the motion residual image reconstructed from the coded error residual image $\epsilon_1$, and for generating from the difference between said current image and said reconstructed image $Nc'_1$ a new error residual image $\epsilon'_1$ used to refine the current level mesh "Mesh 1" towards a new mesh "Mesh 2" then taken as input for a further level, the information concerning the mesh distortion being contained in motion vectors $MV_i$ containing only new nodes at each level i; and at least another enhancement layer encoding step including similar receiving and generating operations; the matching pursuit method being applied during each encoding step to the error residual image $\epsilon_i$ in view of the transmission of the image texture information in the form of atoms.

2. An SNR scalable video encoder comprising, for allowing a progressive transmission of information:

a base layer circuit capable of receiving an input stream of video images and generating therefrom compressed base layer video data suitable for transmission to a video decoder; and at least an enhancement layer circuit capable of generating therefrom enhancement layer video data associated with the compressed base layer video data and suitable for transmission to the video decoder, said encoder being configured for encoding based on a hierarchical triangular mesh representation to which a matching pursuit error coding step is specifically adapted, said encoding comprising the acts of:

receiving a couple of reference and current images N-1 and N and a coarse mesh and encoding by means of a matching pursuit method the error residual image $\epsilon_1$ between the current image N and an associated motion compensated image $Nc_1$, thereby forming a base layer;

receiving said current image and a reconstructed image $N'c_1$ obtained by adding to the motion compensated image $Nc_1$ the motion residual image reconstructed from the coded error residual image $\epsilon_1$, and generating from the difference between said current image and said reconstructed image $Nc'_1$ a new error residual image $\epsilon'_1$ used to refine the current level mesh "Mesh 1" towards a new mesh "Mesh 2" then taken as input for a further level, the information concerning the mesh distortion being contained in motion vectors $MV_i$ containing only new nodes at each level i thereby forming a first enhancement layer; and forming at least another enhancement layer by performing respective receiving and generating operations;

the matching pursuit method being applied during each of said acts to the error residual image $\epsilon_i$ in view of the transmission of image texture information in the form of atoms.

* * * * *